United States Patent [19]
Boy

[11] 3,754,636
[45] Aug. 28, 1973

[54] CONVEYOR BELT CLIP
[75] Inventor: Max W. Boy, Byram, Conn.
[73] Assignee: The Raymond Lee Organization, Inc., New York, N.Y.; a part interest
[22] Filed: Feb. 7, 1972
[21] Appl. No.: 223,958

[52] U.S. Cl................. 198/175, 198/195, 248/72
[51] Int. Cl. ..... B65g 15/30, B65g 19/10, F16l 3/24
[58] Field of Search............................ 198/195, 175; 287/49, 51; 248/71–72

[56] References Cited
FOREIGN PATENTS OR APPLICATIONS
510,397  9/1920  France

Primary Examiner—Edward A. Sroka
Attorney—Howard I. Podell

[57] ABSTRACT

A metal clip, with means to grip a rope or wire rope, and means to grip slabs of metal, wood or other material. A conveyor belt is constructed by fastening said clips to two parallel wire ropes, and joining together each of a pair of such clips, one on each rope, by means of slabs which are gripped by the said metal clips.

3 Claims, 5 Drawing Figures

Patented Aug. 28, 1973
3,754,636
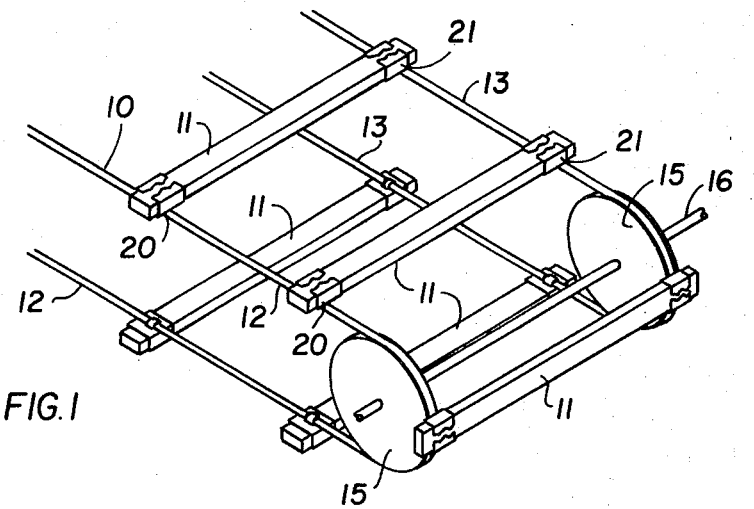
FIG.1
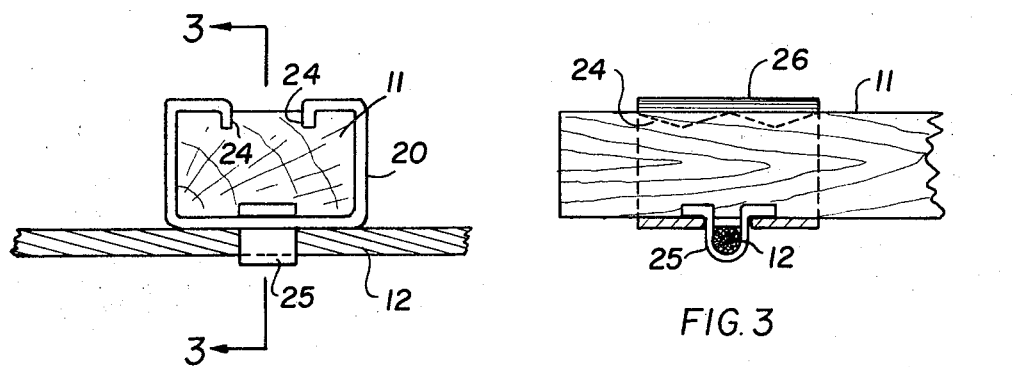
FIG.2
FIG.3
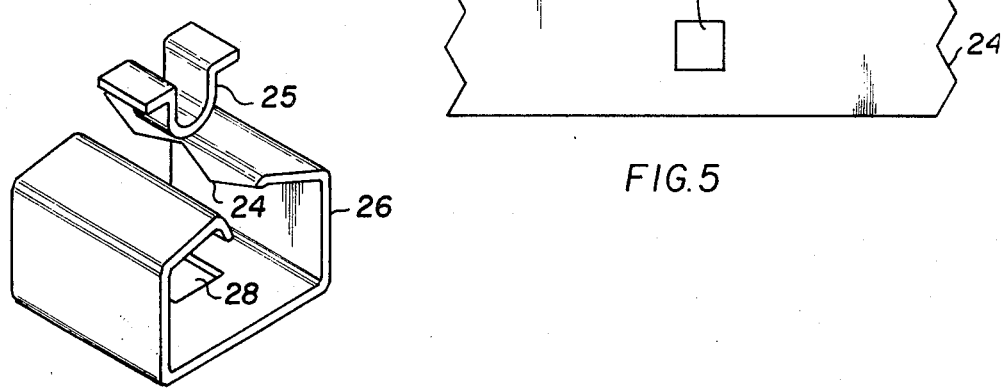
FIG.4
FIG.5

3,754,636

CONVEYOR BELT CLIP

SUMMARY OF THE INVENTION

The purpose of this invention is a simple means of fabricating light weight conveyor belts, and particularly a means of fabricating various size conveyor belts to size, at the job site.

My invention is a double clip which both grips a wire rope and a slab of wood or other material. The conveyor belt is fabricated by joining together pairs of such clips fastened to two parallel wire ropes, by gripping each of the pair of clips to the same slab of wood.

BRIEF DESCRIPTION OF THE DRAWINGS

The objects and features of the invention may be understood with reference to the following detailed description of an illustrative embodiment of the invention taken together with the accompanying drawing in which:

FIG. 1 is a perspective illustration of a conveyor belt fabricated by use of the double clips;

FIG. 2 is a side view of a clip fastend to a wire rope and also fastened to a wood slab;

FIG. 3 is a cross-section of line 3-3 of FIG. 2.

FIG. 4 is an exploded perspective view illustrating construction details in fabricating the clips; and FIG. 5 is a layout of the sheet metal from which one of the clip members is fabricated.

DESCRIPTION OF THE PREFERRED EMBODIMENT

Turning now descriptively to the drawings, in which similar reference characters denote similar elements throughout the several views, FIG. 1 illustrates a conveyor belt 10 fabricated of wood slabs 11 joining clip 20 and clips 21. Clip 20 is fastened to wire rope 12 and clip 21 is fastened to the parallel wire rope 13. The wire ropes 12 and 13 each go around pulleys 15 which are mounted on shaft 16. Shaft 16 may be used to drive the conveyor. If desired a groove may be cut in the periphery of pulleys 15 to guide the wire rope. For positive drive of the conveyor, the groove in the pulley periphery may have notched cutouts spaced apart, the distance of the wire clips, so as to grip the clips and prevent slip of the wire rope over the pulley.

FIG. 2 and FIG. 3 illustrate the manner in which the clip grips both the rope and the wood slab. The clip 20 is composed of wire gripping member 12 and slab gripping member 26. The slab gripping member 26 may have serrated teeth 24 to bite into the wooden slab.

FIG. 4 illustrates the slab gripping member 26 which is bent up from the flat shape illustrated in FIG. 5. The wire gripping U-shaped member 25 fits into the square hole 28 in the clip section, and is crimped to the conveyor rope which is passed through it. Alternately, the wire gripping member 25 may be permanently welded to the slab gripping member 26 in the fabrication of the clip 20.

Since obvious changes may be made in the specific embodiment of the invention described herein without departing from the scope thereof, it is indicated that all matter contained herein is intended to be interpreted in an illustrative sense and not in a limiting sense.

Having thus described my invention, what I claim as new, and desire to secure by Letters Patent of the United States is:

1. A metal clip for use in fabricating conveyor belts, said metal clip being of two part construction, comprising a wire gripping member and a slab gripping member, said wire gripping member being of U shape design, with flanges so as to fit into a hole in the slab gripping member, with flanges of the wire gripping member securing the wire gripping member to the said slab gripping member, said wire gripping member in the installed position being crimped fast to a wire rope passing through the U-shaped portion of the wire gripping member protruding from slab gripping member, said slab gripping member of a shape and size so as to encircle a section of a slab, with provisions for gripping said slab, with a multiplicity of said metal clips serving to form a conveyor belt with the wire gripping members of said metal clips crimped fast to two parallel wire ropes, and each metal clip fastened on one of the wire ropes joined by means of a cross-member to an adjoining metal clip fastened on the parallel wire rope.

2. The metal clip described in claim 1 in which the slab cross-member gripping member has serrated teeth set at an angle to the bearing surfaces of said slab gripping member so that the serrated metal teeth will bite into a wooden slab which is gripped by the said slab gripping member.

3. The metal clips described in claim 2 fastened as described to wire ropes and to slabs so as to form a conveyor belt.

* * * * *